Dec. 29, 1936.  P. W. COWAN  2,066,031
ADJUSTING MEANS FOR PRINTING PRESS ROLLERS
Filed Feb. 23, 1935
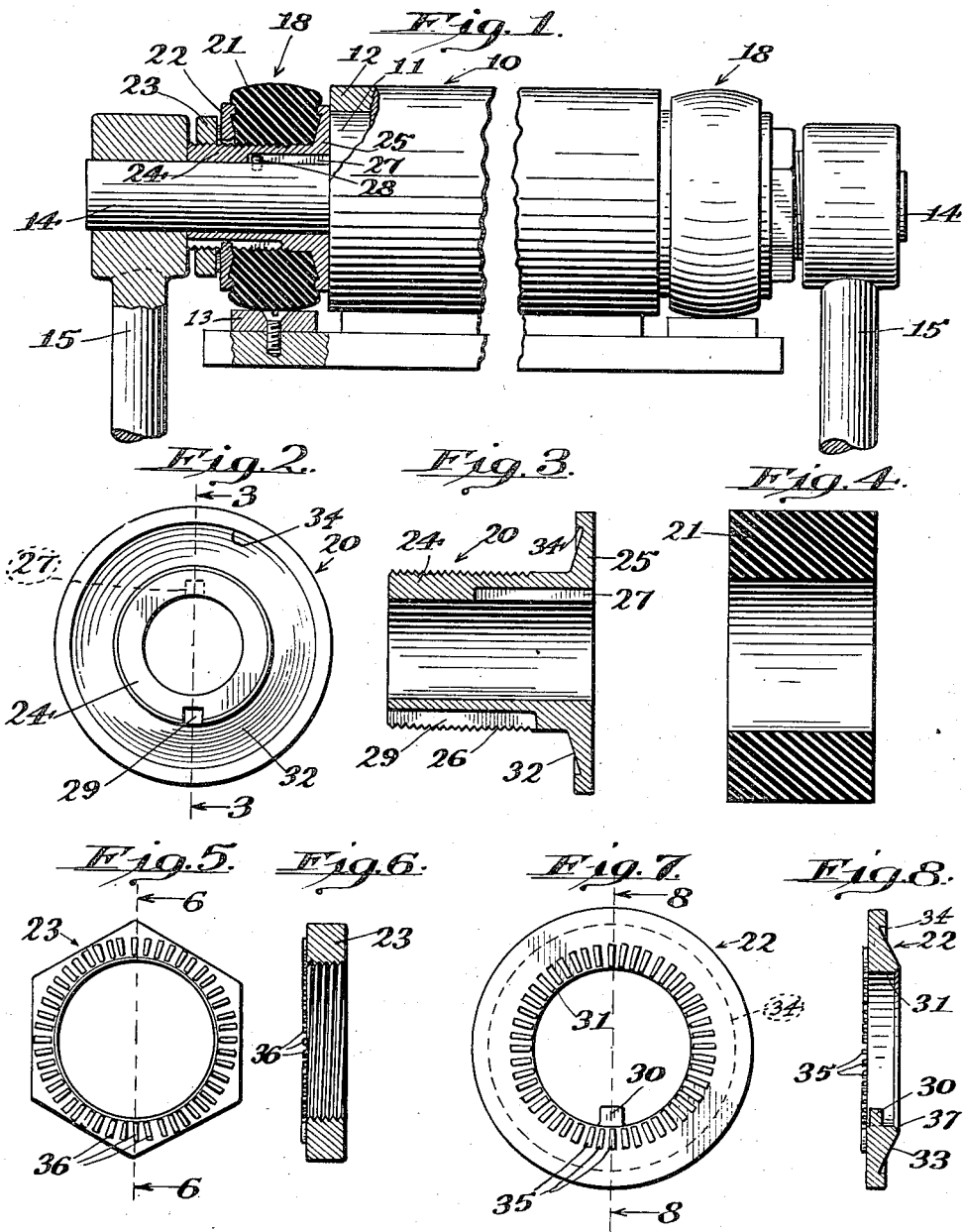
Inventor:
Park W. Cowan
Edmund A. Strauss
Attorney.

Patented Dec. 29, 1936

2,066,031

UNITED STATES PATENT OFFICE 2,066,031

ADJUSTING MEANS FOR PRINTING PRESS ROLLERS

Park W. Cowan, Los Angeles, Calif.

Application February 23, 1935, Serial No. 7,784

1 Claim. (Cl. 101—348)

This invention relates to trucks for inking rollers of printing presses, more particularly to the means for adjusting the size of the same and is an improvement over the construction disclosed in U. S. Letters Patent No. 1,240,078 issued September 11, 1917.

In the above construction the rubber rings or tires which roll over the tracks of the press frame were positioned between taper faced flanges formed on threaded sleeves and correspondingly shaped collars slidably mounted thereon, the tires being expanded (to increase the diameter of the same) by application and turning of nuts on said sleeves.

While this form of construction served its intended purpose certain defects developed when in use viz the tires worked over the flange and collar (when expanded) or the nut became loose on the threads.

It is therefore an object of the present invention to provide a truck construction in which the above objectionable features will be eliminated.

Another object is to provide an improved ring or tire mounting of the character referred to in which the diameter of the tire may be increased without danger of forcing it over the flanges and collar of the same.

Other objects and advantages will be apparent from the following description, references being had to the accompanying drawing in which:

Fig. 1 is an elevation of an inking roller with the improved truck mounted thereon parts being broken away and shown in section.

Fig. 2 is a face view of the tire supporting member.

Fig. 3 is a section taken on line 3—3 of Fig. 2.

Fig. 4 is an axial section taken through the tire.

Fig. 5 is a face view of the nut.

Fig. 6 is a section taken on line 6—6 of Fig. 5.

Fig. 7 is a face view of the collar.

Fig. 8 is a section taken on line 8—8 of Fig. 7.

Referring more specifically to the drawing, 10 designates a conventional inking roller which comprises a cylindrical core 11 having a covering of gelatinous material 12 formed thereon.

Projecting from the opposite end of core 11 are stud shafts 14 of reduced diameter that extend into openings formed in the ends of arms 15 which serve to move the rollers over the type and inking plate of the printing press in the usual manner.

The present invention resides in the construction of the trucks generally designated at 18 which roll upon tracks 13 and serve to support the inking roller 10 and are mounted on the shafts of the same as follows:

Each truck consists of a supporting member 20, ring or tire 21, collar 22 and a nut 23.

Referring to Figs. 2 and 3 supporting member 20 consists of sleeve or tubular portion 24 formed integral with an annular flange or disk 25, the sleeve being externally screw threaded as indicated at 26 for reception of the nut 23.

Formed in the face of the opening or bore of the sleeve is a groove 27 that engages a pin 28 projecting from the stud shafts, when positioned thereon, the pin and groove serving to hold the members against rotation on said shafts.

Formed in the external face of sleeve 24 is a groove 29 that receives a lug 30 which projects inwardly from the bore 31 of the collar 22 for holding the latter against rotation thereon.

The inner faces of the collar 22 and flange 25 of member 20 are slightly beveled or tapered in cross section as indicated at 32 and 33 respectfully and terminate adjacent their periphery at which point annular shoulders or offsets 34 are formed that engage and grip the tire as shown in Fig. 1.

Formed on the flat faces of collar 22 and nut 23 is a plurality of evenly spaced radially disposed lugs designated at 35 and 36 respectively that mesh or interlock with each other and serve to prevent unscrewing of the nut on the sleeve after the tire has been compressed or expanded.

It will be understood that the tire yields sufficiently during turning of the nut to permit the lugs on said nut and collar to pass over each other.

A chamfer or bevel 37 formed on the bore of collar 22 serves as a grip on the tire in addition to the shoulders 34 for preventing the same from working over the edges of the flanges when in use. In assembling the tire is placed on the sleeve portion 24 of member 20, and moved into engagement with the flange 25, collar 22 is then applied and the nut 23 screwed on the sleeve until the tire becomes expanded. The truck units thus assembled are then placed on the stud shafts 14 and the nuts turned (with a wrench) to increase or diminish the diameter of the tires in relation to the height of the type so that the face of the roller will bear evenly on the same and with the required pressure.

I claim:

A printing press inking roller truck comprising a supporting member including an externally screw threaded sleeve and a flange having a tapered face terminating in an annular shoulder, a collar having a tapered face terminating in an annular shoulder slidably mounted on the sleeve of said supporting member and rotatable therewith, an annular rubber tire mounted on the sleeve of the supporting member, and a nut threaded on the sleeve for expanding said tire, the annular shoulders on said flange and collar gripping and preventing the tire from working over the same when expanded, there being a plurality of radially disposed lugs formed on the faces of said collar and nut.

PARK W. COWAN.